Nov. 18, 1941.  A. Y. DODGE  2,263,263
BRAKE
Filed March 28, 1938   3 Sheets-Sheet 1
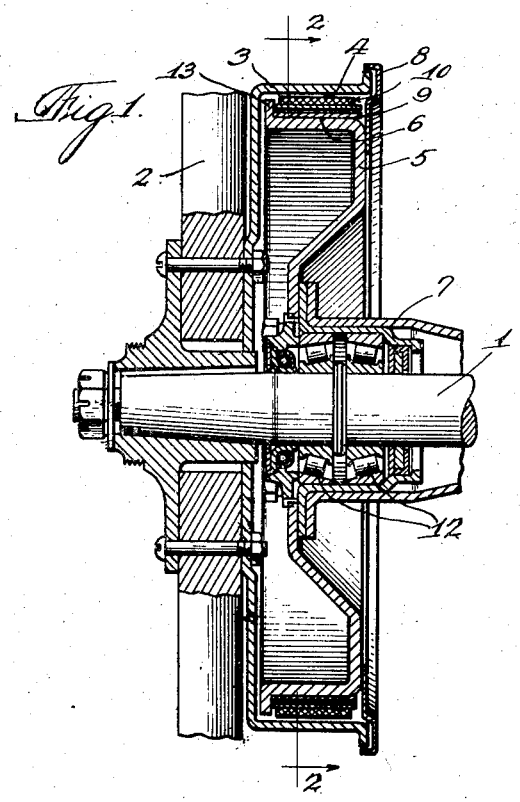
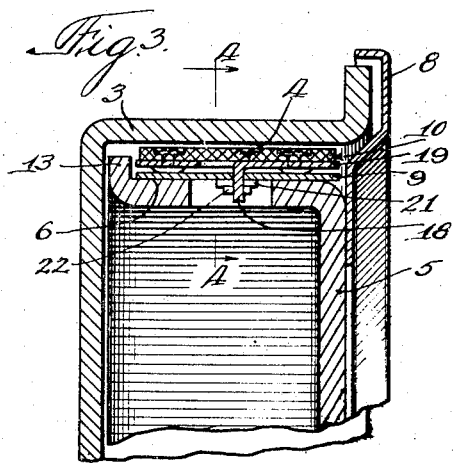
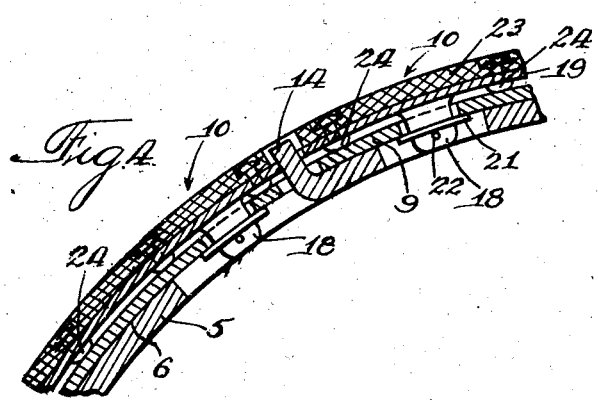
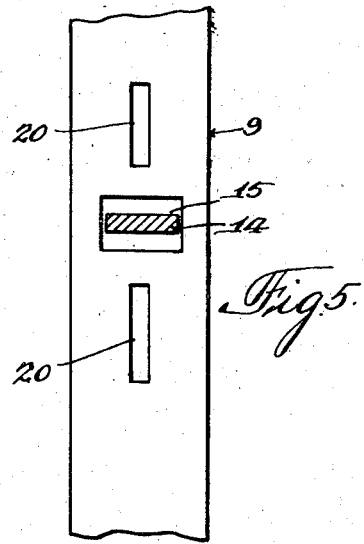
Inventor.
Adiel Y. Dodge.
By Anno, Thiess, Olson & Meckelnburg
Attys.

Nov. 18, 1941.   A. Y. DODGE   2,263,263
BRAKE
Filed March 28, 1938   3 Sheets-Sheet 2

Inventor
Adiel Y. Dodge.
By Amb, Thuss, Olsen & Mecklenburger
Attys

Patented Nov. 18, 1941

2,263,263

UNITED STATES PATENT OFFICE 2,263,263

BRAKE

Adiel Y. Dodge, Rockford, Ill.

Application March 28, 1938, Serial No. 198,378

5 Claims. (Cl. 60—54.5)

My invention relates to brakes.

One of the objects of my invention is to provide such a brake construction in which the initial "take-up" movement of the actuating band is effected by a relatively high speed hydraulic transmission between the brake pedal and the hydraulic band actuator and in which the final "pressure applying" movement of the actuating band is effected by a relatively low speed hydraulic transmission between the brake pedal and the hydraulic band actuator.

A further object of my invention is to provide such a construction in which, in case the low speed transmission fails in applying the braking pressure, the "high speed" transmission will be effective for this purpose.

I am aware that there have been previous attempts to accomplish some of these objectives. However, it is naturally out of the question to use any brake control apparatus which brings about a sudden change of application of pressure.

Further objects and advantages of the invention will be apparent from the description and claims.

In the drawings, in which several embodiments of my invention are shown,

Figure 1 is an axial section showing the brake construction and associated parts;

Fig. 3 is an enlarged axial section showing the brake drum and backing plate;

Fig. 4 is a sectional view substantially on the line 4—4 of Fig. 3;

Fig. 5 is a detail view showing the actuating band;

Figure 2:
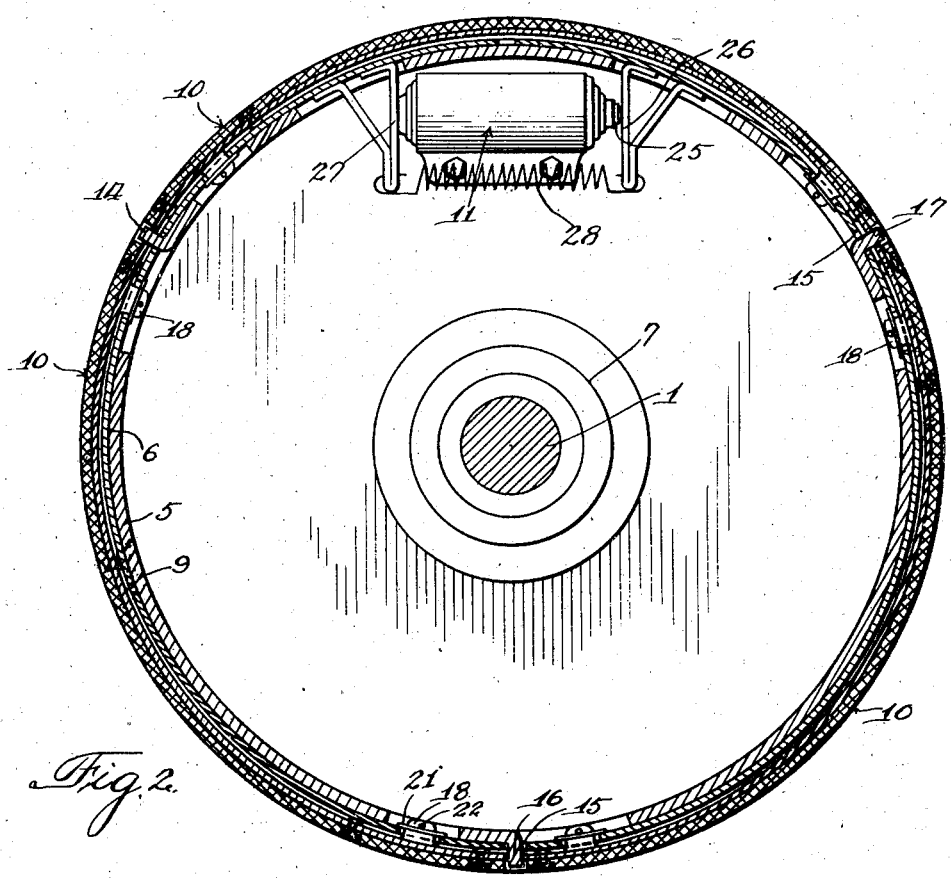
Fig. 2 is a transverse section substantially on the line 2—2 of Fig. 1.

Referring first to Figs. 1 to 5, inclusive, the construction shown comprises an axle 1 which may be the axle of an automobile, a portion of one of the wheels 2 mounted on this axle to rotate therewith, a brake drum 3 having an internal braking surface 4 secured to this wheel 2, a backing plate 5 having a cylindrical band-supporting surface 6 secured to a nonrotatable part of the automobile such as the housing 7 for the bearings for the axle 1, a guard member 8 secured to this backing plate 5, a flexible metal cylindrical expansible band 9 extending around the major portion of the cylindrical supporting surface 6 and engaging and supported by said surface when in contracted condition, a plurality of flexible segmental arcuate brake band members 10 (three being shown) lying between said expansible band 9 and said cylindrical braking surface 4, means for holding one end of said expansible band against circumferential movement with respect to said cylindrical supporting surface 6, fluid pressure means 11 for forcing the other end of the band 9 circumferentially away from the stationary end of the band, and means for holding the flexible brake band members 10 against circumferential movement with respect to the cylindrical supporting surface 6.

The wheel and axle construction may be of any suitable type, that shown comprising suitable anti-friction bearings 12 by means of which the axle 1 and wheel 2 are rotatably mounted in the nonrotatable housing member 7. The expansible band 9 and the arcuate brake band members 10 are held in place against excessive lateral movement between the flange 13 on the backing plate 5 and the guard plate 8 secured to the backing plate. The means for holding one end of the expansible band against circumferential movement comprises an abutment member 14 struck up from the material of the backing plate and extending through and fitting fairly closely in an opening 15 in the expansible band (Fig. 5). The means for holding the flexible brake band members against circumferential movement comprise, in addition to the abutment member 14, a number of other abutment members 16 and 17 also struck up from the material of the backing plate 5, these abutment members 14, 16, and 17 being engageable by the ends of the segmental brake band members 10 which are held by said abutment members against any substantial circumferential movement. The segmental brake band members are secured to the flexible expansible band by means of tongues 18 struck up from the metal reinforcing plates 19 of the brake band members and extending through corresponding registering openings 20 in the expansible band 9, and washers 21 through which the ends of the tongues extend, the washers being held in place on the tongues in any suitable manner as by means of pins 22 extending through the tongues 18 and engaging the washers 21.

Each segmental brake band member comprises, in addition to the sheet metal reinforcing plate 19, a flexible brake lining member 23 secured to the backing plate in any suitable manner, as by rivets 24 or the like. A clearance is provided between the tongues 18 and the edges of the openings 20 in the expansible band to provide for the necessary relative movement between the expansible band and brake band members, as shown in Fig. 4.

The actuating expansible band is provided with suitable openings 15 through which the abutment members extend, all of the openings being provided with a clearance, as shown in Fig. 2, to enable the expanding action of the expansible band. For expanding the band, any suitable actuator may be provided, that shown comprising a hydraulic cylinder 11 mounted on the backing plate 5 and having a hydraulically actuated plunger 25 engaging an abutment member 26 secured to and adjacent one end of the expansible band 9. The other end of the expansible band may be provided with a suitable abutment member 27 engaging a fixed portion on the casing of the hydraulic cylinder 11. A suitable coil tension spring 28 may be provided for contracting the expansible band when the hydraulic pressure is released.

As the band 9 contracts, it will carry with it the segmental brake band members 10 which, as previously described, are secured to the expansible band. With this construction, it will be seen that as the expansible band 9 contracts, it will wrap smoothly into cylindrical shape about the cylindrical supporting surface 6 of the backing plate 5 and thus the expansible band 9 and the brake band members 10 carried thereby will be supported in coaxial relation with respect to the inner cylindrical braking surface 4 and out of contact therewith. This will cause the braking surface of the segmental brake band members 10 to be uniformly spaced from the cylindrical braking surface 4 throughout their entire extent when the flexible expansible band 9 is wrapped snugly about the cylindrical surface 6 of the backing plate. It will also be seen that in use when the brakes are applied, the flexible brake band members 10 will have a self-energizing action constituting in effect three flexible, segmental, arcuate brake band members, each having substantially a one-third wrap which will give a substantial amount of self-energizing action to the brake band members.

It will be noted that I have shown no provision for take-up or adjustment between the hydraulic actuator 11 and the expansible band 9 to take care of wear on the brake band members 10, the intention being that even when the brake band members are worn down as thin as it is advisable to allow them to wear, there will still be sufficient movement of the expansible band 9 to move the band from its position of extreme contraction, in which it closely hugs the cylindrical surface 6 of the backing plate 5 to its extremely expanded position in which the brake band members 10 are pressed snugly into engagement with the cylindrical braking surface 4.

Assuming that the brake band members will wear down sixty-thousandths (.060) of an inch and that it may be desirable to have a ten-thousandths (.010) of an inch clearance between the unworn brake band members 10 and the cylindrical braking surface 4 when the expansible band 9 is fully contracted, it will be seen that the diameter of the expansible band will have to change at least one-hundred-forty-thousandths (.140) of an inch from its fully contracted condition to its fully expanded condition, when the brake band members 10 are worn thin. This requires a substantial movement of the plunger 25 of the hydraulic actuator 11, a large portion of which movement is expended simply in moving the actuating band 9 from its fully-contracted condition to an expanded condition in which it just begins to exert braking pressure. The motion of the plunger 25 of the hydraulic actuator may thus be divided into two parts, the first part of the movement being simply to expand the expansible band 9 against the contractile forces, due to its inherent contractile condition and to the contractile effect of the tension spring 28, and the second part of the movement being that in which braking pressure is exerted to press the brake band members 10 against the cylindrical braking surface 4. The first part of this movement requires a relatively small force, whereas the second part of the movement may require a very considerable force to cause the desired braking effect.

In order to secure this relatively large movement of the hydraulic actuator, I provide hydraulic transmission between the brake pedal or brake actuator and the hydraulic cylinder 11 by means of which the first part of the movement of the pedal or brake actuator will cause a relatively large and rapid movement of the plunger 25 of the expansible band actuator and whereby the latter part of the movement of the brake pedal or the brake actuator will cause a relatively short, slow and forceful action of the plunger 25 of the actuator for the expansible band. I also provide means whereby if that part of the hydraulic transmission which supplies the slow, forceful action of the band actuator fails, the other relatively rapid, low force part of the transmission may be used as an emergency apparatus to cause the application of brake pressure.

Figure 6:
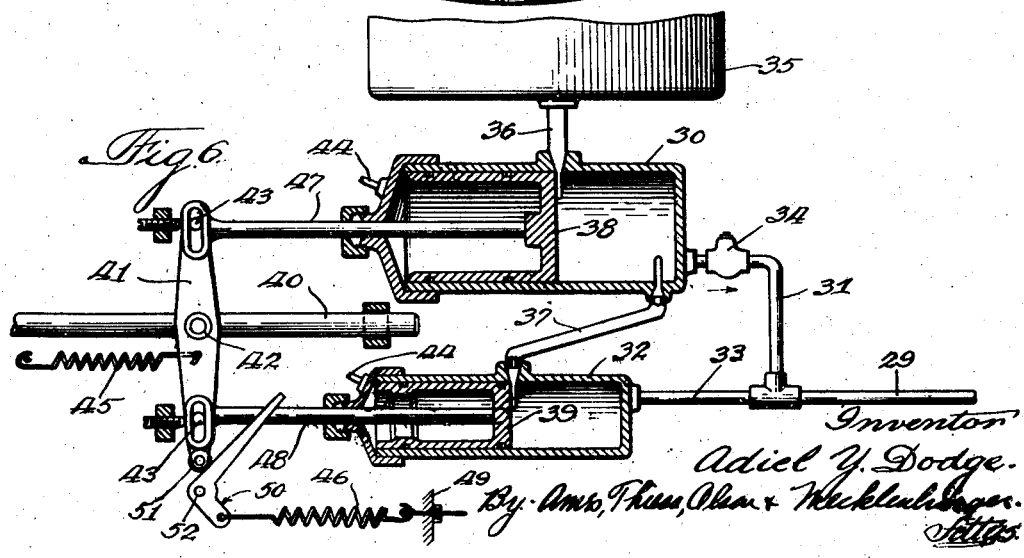
Fig. 6 is a diagrammatic view showing a hydraulic actuator for supplying fluid pressure to the brake cylinder.

The construction shown in Fig. 6 comprises a fluid conduit 29 connected with the cylinder of the expansible band actuator 11, a relatively large diameter low pressure cylinder 30 connected with this conduit by a conduit 31, a relatively small diameter, high pressure cylinder 32 connected with the conduit 29 by a conduit 33, a check valve 34 in the conduit from the low pressure cylinder to the conduit, permitting flow in the direction of the arrow from the cylinder 30 to the conduit 29 but preventing flow in the reverse direction, a fluid reservoir 35 connected with the low pressure cylinder 30 by a conduit 36, a conduit 37 connecting the low pressure cylinder 30 with the high pressure cylinder 32, a piston 38 operating in the low pressure cylinder 30, a piston 39 operating in the high pressure cylinder 32, a reciprocable plunger 40 connected with the brake pedal or brake actuator, an equalizer bar 41 pivotally connected at 42 with the reciprocable plunger 40 and having pin and slot connections 43 with the piston rods of the high and low pressure pistons, respectively, and spring means opposing resistance to the movement of the arm of the equalizer bar connected with the high pressure piston rod.

Suitable bleed connections 44 may be provided for the high and low pressure cylinders, which bleed connections may, if desired, lead to the reservoir.

In using this transmission, the first part of the movement of the reciprocable plunger 40 will cause movement of the low pressure piston 38 only, since movement of the high pressure piston is opposed by the action of the springs 45 and 46. It will be seen that the only resistance to the movement of the low pressure piston 38 is that of the fluid in the cylinder 30 acting on the relatively large exposed surface of the piston but that the forces opposing movement of the high pressure piston 39 include, in addition to the pressure of the fluid in the cylinder acting on the relatively small surface of the piston, the action of the springs 45 and 46 which also oppose movement of the piston. As the effective lever arms of the equalizer 41 acting on the piston rods 47 and 48 are substantially equal, it will be seen that as the brake-actuating slide 40 is moved, one of the pistons will be actuated which opposes the least resistance to movement. It will also be seen that so long as the low pressure cylinder is moving and causing fluid to flow through the conduit, the pressure in the two cylinders will be substantially the same, as the two cylinders are then in communication with each other through the conduits 31 and 33. Under these conditions, the force opposing motion of the large piston 38 will be the area of this piston times the unit pressure of the fluid, and the force opposing motion of the high pressure piston 39 will be the area of the small piston, times the unit area fluid pressure, plus the two spring resistances 45 and 46. It will be seen that an increase in fluid pressure will have a much greater resisting effect on the larger piston than on the smaller piston, that this differential increase in resisting effect will eventually overcome the resisting effect of the springs, and that thereafter the larger piston will cease to move and the smaller piston will begin to move gradually.

When the brake actuator slide 40 has been moved sufficiently to move the brake band members 10 into engagement with the cylindrical braking surface 4, the pressure in the conduit 29 will increase, due to the increased resistance to further expansion of the expansible band 9, and when this pressure has increased to such an extent that its opposition to movement of the large low pressure piston 38 is greater than the opposition to movement of the high pressure piston 39, caused by the pressure on the relatively small piston and the action of the springs 45 and 46, the low pressure piston 38 will gradually be brought to a standstill and the high pressure piston 39 will gradually begin to move. This will enable a relatively slow but forceful action to be exerted on the hydraulic actuator. During the movement of the high pressure piston 39, the check valve 34 will close, preventing fluid from flowing from the high pressure cylinder into the low pressure cylinder. The movement of the high pressure piston is sufficient to cause the necessary pressure to be exerted on the expansible band 9. However, if, because of wear or for any reason, the movement of the high pressure piston 39 should not be sufficient to move the brake band members 10 with sufficient pressure against the braking surface 4, further movement of the brake-actuating slide 40 will cause a further movement of the low pressure piston 38 so that by exerting an abnormal pressure on the brake-actuating slide 40, the low pressure piston 38 may be used to effect the final movement of the brake band members.

It will be noted that one of the springs 46 opposes a variable resistance to the motion of the high pressure piston 39. This is accomplished by connecting the spring at one end to a fixed support 49 and at the other end to a bell crank lever 50, one arm of which is engaged by a roller 51 on the end of the equalizer lever 41, the bell crank lever being pivotally mounted at 52. As the high pressure piston 39 moves to the right, the roller 51 on the equalizer lever will roll along the arm of the bell crank lever, thus changing the angle of the surface engaging the roller and changing the effective lever arm of that arm of the bell crank engaging the roller, thus opposing a gradually decreasing resistance to the movement of the high pressure piston 39. It will be noticed that in the shift of movement from the low pressure piston 38 to the high pressure piston 39, a point of equilibrium is reached and passed so that the low pressure piston will come to rest gradually and the high pressure piston will start to move gradually.

When it is desired to release the brake, the brake-actuating slide 40 is allowed to move to the left, as viewed in Fig. 6, under the action of a suitable spring 45. This movement of the slide will first cause the high pressure piston 39 to move to the left to enable the fluid to flow from the cylinder of the expansible band actuator 11 to the high pressure cylinder 32, the check valve 34 preventing any return flow to the low pressure cylinder 30. When the high pressure piston 39 has moved to the left to the position shown in Fig. 6, communication is established between the high pressure cylinder 32 and the low pressure cylinder 30 through the conduit 37. This enables fluid to flow from the band actuator 11 through the conduits 29 and 33 into the high pressure cylinder 32 and thence through the conduit 37 into the low pressure cylinder 30, enabling the low pressure piston 38 to return to the position shown in Fig. 6.

Figure 7:
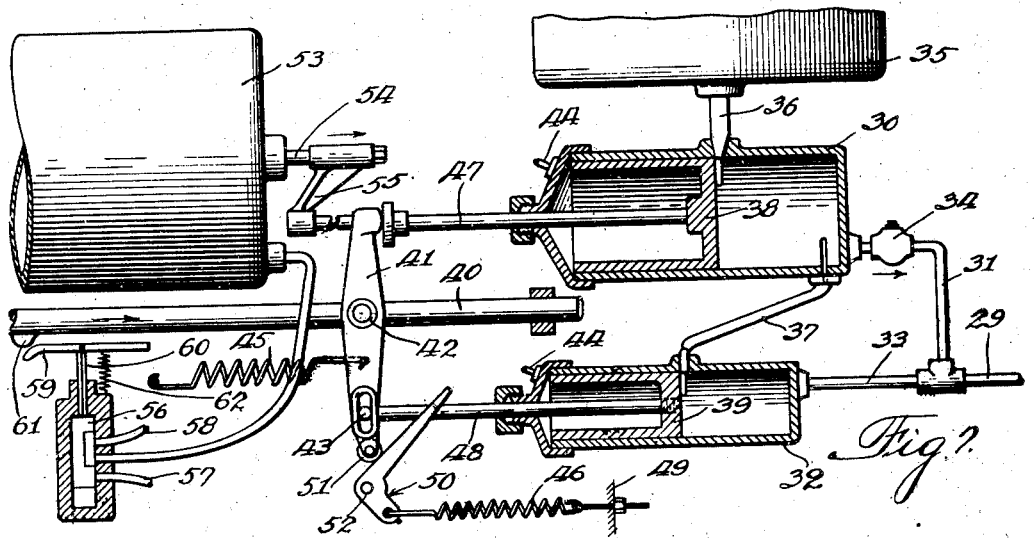
Fig. 7 is a diagrammatic view showing another form of hydraulic actuator.

The construction shown in Fig. 7 is similar to that of Fig. 6, including the following parts: the conduit 29, the low pressure cylinder 30, the conduit 31, the high pressure cylinder 32, the conduit 33, the check valve 34, the reservoir 35, the conduits 36 and 37, the low pressure piston 38, the high pressure piston 39, the push rod 40, the equalizer bar 41, the pivotal connection 42, the pin-and-slot connection 43, the vents 44, the springs 45 and 46, the piston rods 47 and 48, the fixed support 49, the bell crank lever 50, the roller 51, and the pivotal mounting 52. The operation of the above parts is similar to the operation of the corresponding parts in Fig. 6. This construction, however, comprises in addition a pneumatic booster for the pedal-actuated slide. This pneumatic booster comprises a power cylinder 53 and a power piston having a piston rod 54 connected by an arm 55 with the piston rod 47 of the low pressure cylinder 30. This pneumatic booster is controlled by the valve mechanism having a valve 56 which in one position may connect the power cylinder 53 with the engine intake manifold connection 57 and which in another position connects the power cylinder 53 with the discharge connection 58. This valve mechanism is controlled by a cam member 59 secured to the valve stem 60, which cam member is depressed by a cam member 61 on the pedal-actuated rod 40. A coil compression spring 62 may be provided for returning the valve to exhaust position when the brake pedal is released. With this construction, therefore, there will be three forces acting on the low pressure piston 38 instead of two forces as in the construction of Fig. 6. These three forces are the fluid pressure in the low pressure cylinder, the force exerted by the equalizer lever acting on the piston rod, and the force exerted by the vacuum booster acting on the piston rod. In this form also the motion of the high and low pressure pistons is dependent on the preponderance of forces acting on the respective pistons. If the algebraic sum of the forces acting to move the low pressure piston to the right is greater than the algebraic sum of the forces tending to move the high pressure piston to the right, the low pressure piston will move, and, vice-versa, if the algebraic sum of the forces acting to move the high pressure piston to the right is greater than the algebraic sum of the forces acting to move the low pressure piston to the right, the high pressure piston will be the one which moves.

The purpose of the vacuum booster cylinder is to actuate the low pressure hydraulic cylinder with just sufficient force to cause a very mild amount of braking action or deceleration. In this construction the only energy which the high pressure cylinder must transmit is that necessary to increase the degree of braking (that is, to increase the force of movement necessary to follow up deflections and drum expansion). Thus the leverage employed between the brake pedal and the band actuating cylinder 11 may be increased so that a good muscular effort will suffice to decelerate a heavier vehicle than would otherwise be possible.

As indicated above the force exerted by the vacuum booster cylinder 53 may be relatively slight. When the forces exerted on the piston rod 47 by the lever 41 and by the vacuum booster 53 have tightened the brakes to a condition in which the resistance to braking action causes a back pressure in the cylinder 30, sufficient to stop the movement of the piston 38, continued pressure on the rod 40 will cause the lower end of the lever 41 to overcome the resistance of the spring-pressed lever 50. This will cause movement of the high pressure piston 39 and the supply of liquid at high pressure to the power cylinder 11.

Figure 8:
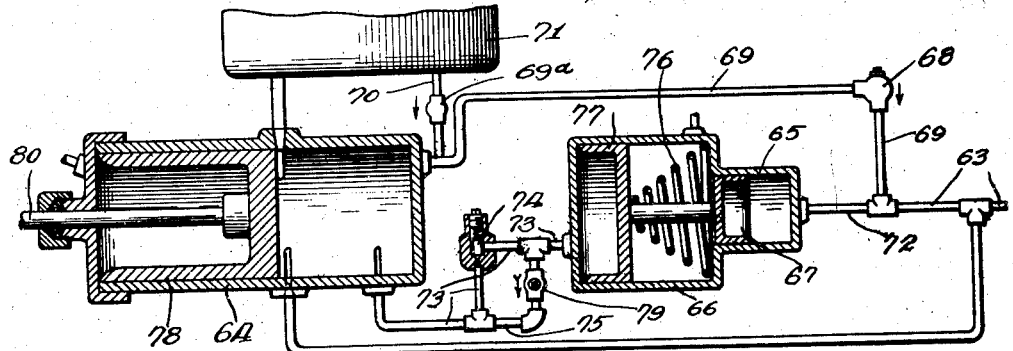
Fig. 8 is a diagrammatic view showing another form of hydraulic actuator.

The construction shown in Fig. 8 comprises a conduit 63 leading to the cylinder of the band actuator 11, a low pressure cylinder 64 for causing the initial movement of the band actuator 11, a high pressure cylinder 65 for causing the final movement of the band actuator, and a relatively large hydraulic cylinder 66 for actuating the piston 67 of the high pressure cylinder 65. A check valve 68 is provided in the conduit 69 leading from the low pressure cylinder 64 to the conduit 63 leading to the band actuator 11, permitting flow from the cylinder 64 to the conduit 63 but preventing return flow. A check valve 69a is provided in a conduit 70 leading from the reservoir 71 to the discharge end of the low pressure cylinder 64 permitting fluid to flow from the reservoir 71 into the low pressure cylinder but preventing return flow. A conduit 72 is provided leading from the high pressure cylinder 65 to the conduit 63 leading to the band actuator 11. A conduit 73 is provided from the low pressure cylinder 64 to the actuator cylinder 66. A pressure-actuated valve 74 is provided in this passage which will open to enable fluid to flow from the low pressure cylinder 64 to the actuator cylinder 66 only when the pressure reaches a predetermined amount. A by-pass conduit 75 is provided to enable the return flow from the actuator cylinder 66 to the low pressure cylinder 64 to enable the spring 76 to return the actuator piston 77 when the pressure on the brake pedal is released to enable the low pressure piston 78 to move to the left. A check valve 79 is located in this by-pass conduit 75 which enables fluid to flow from the actuator cylinder 66 into the low pressure cylinder 64 but prevents flow from the low pressure cylinder into the actuator cylinder. A conduit 79a is provided leading from the reservoir 71 to keep the cylinder full of fluid, a suitable check valve being provided to prevent flow from the cylinder 66 to the reservoir.

In order to enable the low pressure piston 78 to complete its movement to the left when the brake pedal is released, the conduit 70 is provided between the reservoir 71 and the right-hand end of the low pressure cylinder 64 provided with the check valve 69 which will enable fluid to flow from the reservoir into the low pressure cylinder but which will prevent flow from the low pressure cylinder into the reservoir. The check valve 68 is provided in the passage leading from the low pressure cylinder to the band actuator 11 which will permit fluid to flow from the low pressure cylinder to the band actuator but will prevent flow from the high pressure cylinder 65 back into the low pressure cylinder 64.

With this construction, initial movement of the push rod 80 will move the low pressure piston 78 to the right, causing fluid to flow through the conduit 69 into the cylinder 11 of the band actuator to effect a rapid relatively large movement of the plunger of the band actuator 11. When the resistance to movement of the band actuator increases to an extent to raise the pressure in the line, the spring-pressed valve 74 controlling communication between the low pressure cylinder 64 and the actuator cylinder 66 will be forced open and pressure will be exerted on the actuator piston 77 to move the high pressure piston 67 to the right, thus causing a powerful slow motion action of the band actuator 11 to cause the final braking action.

When the push rod 80 is released, the high pressure piston 67 will move to the left because of the action of the coil compression spring 76 and the pressure of the fluid on the high pressure piston. This will force fluid from the actuator cylinder 66, through the by-pass conduit 75, past the check valve 79, and through the conduit 73 into the low pressure cylinder 64. When the actuator piston 77 has moved to its extreme left-hand position, as shown in Fig. 8, the low pressure piston 78 will continue to move to the left under the action of a suitable return spring (not shown), fluid being withdrawn from the reservoir 71, through the conduit 70, past the check valve 69, and into the low pressure cylinder 64.

Figure 9:
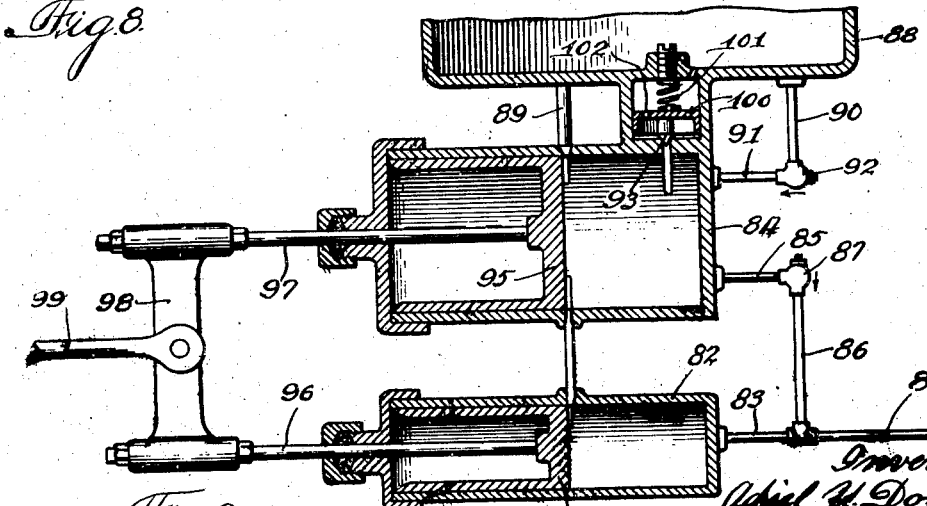
Fig. 9 is a diagrammatic sectional view showing another form of hydraulic actuator.

In Fig. 9 the construction shown comprises a conduit 81 leading to the band actuator 11, a high pressure cylinder 82 in communication with this conduit 81, through the conduit 83, a low pressure cylinder 84 in communication with the conduit 81, through the conduits 85 and 86 and past the check valve 87, a reservoir 88 in communication with the low pressure cylinder 84, through the conduit 89 and through the conduits 90 and 91, past the check valve 92, a spring-pressed pressure-controlled valve 93 controlling communication between the low pressure cylinder 84 and the reservoir 88, pistons 94 and 95 for the high and low pressure cylinders, respectively, and piston rods 96 and 97 for these cylinders secured to a crosshead 98 actuated by the brake-actuating rod 99.

In this construction, the high and low pressure pistons are moved together by the crosshead 98 rigidly connected to the piston rods. During the first part of the movement of the crosshead, fluid will be supplied to the band actuator 11 both from the low pressure cylinder and from the high pressure cylinder. However, when the resistance to further expansion of the expanding band causes the pressure in the system to rise, the pressure-actuated valve 93 will open due to this rise in pressure, and further movement of the low pressure piston 95 will simply force fluid back from the cylinder 84 into the reservoir 88. After the spring-pressed valve 93 is opened, pressure of the fluid on the piston 100 which carries the valve 93 will assist in holding the valve 93 open against the pressure of the spring 101. A bleed vent 102 is provided in this piston to permit the passage of fluid therethrough from the low pressure cylinder into the reservoir.

After the low pressure cylinder 84 ceases to supply fluid to the band actuator 11, the high pressure cylinder 83 will continue to supply fluid to effect the final braking movement.

Further modifications will be apparent to those skilled in the art and it is desired, therefore, that the invention be limited only by the scope of the appended claims.

Having thus described my invention, what I claim and desire to secure by Letters Patent is:

1. A fluid power transmission apparatus comprising an actuating member, a fluid motor, and transmission between said actuating member and motor comprising a high displacement pump and a low displacement pump, both supplying fluid to said motor, means whereby, as the actuating member is moved during an early part of said movement, the high displacement pump will supply all or a relatively large proportion of the fluid supplied to said motor and during a later part of said movement the high displacement pump will supply none or a relatively small proportion of the fluid supplied to the motor and the low displacement pump will supply all or a relatively large proportion of the fluid supplied to the motor, said means including power-transmitting instrumentalities acting between said actuating member and pumps, respectively, and including also yieldable variable resistance means opposing movement of said low displacement pump with a force which decreases gradually with the movement of said low displacement pump whereby at approximately the position in which the high displacement pump lessens its proportion of fluid supply to the motor the ratio of power transmitted to the motor with respect to power supplied to the actuating member is relatively low and whereby as movement of the actuating member continues said ratio increases.

2. A fluid power transmission apparatus comprising an actuating member, a fluid motor, and transmission between said actuating member and motor comprising a high displacement pump and a low displacement pump, both supplying fluid to said motor, means whereby, as the actuating member is moved during an early part of said movement, the high displacement pump will supply all or a relatively large proportion of the fluid supplied to said motor and during a later part of said movement the high displacement pump will supply none or a relatively small proportion of the fluid supplied to the motor and the low displacement pump will supply all or a relatively large proportion of the fluid supplied to the motor, said means including power-transmitting instrumentalities acting between said actuating member and pumps, respectively, and including also yieldable resistance means opposing initial movement of said low displacement pump whereby at approximately the position in which the high displacement pump lessens its proportion of fluid supply to the motor the ratio of power transmitted to the motor with respect to power supplied to the actuating member is relatively low and whereby as movement of the actuator continues said ratio increases, said yieldable resistance means comprising a spring-pressed lever whose lever arm ratio changes as the low displacement pump moves.

3. In an hydraulic brake applying apparatus a high displacement low pressure cylinder and piston, a low displacement high pressure cylinder and piston, and means for actuating said pistons and controlling their movement, said actuating means comprising a common actuator for said pistons, said movement-controlling means comprising a resistance gradually decreasing as the low displacement piston moves, said resistance opposing movement of said low displacement piston and preventing movement of said low displacement piston until the high displacement piston has created a pressure resistance to its movement sufficient to cause the force applied to the low displacement piston to overcome the opposing gradually decreasing resistance.

4. In an hydraulic brake actuating transmission, the combination of a pedal, a low pressure chamber, a high pressure chamber and pressure actuators, force-transmitting and dividing means connecting the low and high pressure actuators to the pedal, and a yieldable and decreasing resistance means acting to resist the high pressure actuator with continually decreasing resistance after a predetermined pressure has been reached.

5. In an hydraulic brake actuating transmission, the combination of a pedal, a low pressure chamber, a high pressure chamber and pressure actuators, a force-transmitting and dividing means connecting the low and high pressure actuators to the pedal, yieldable and decreasing resistance means acting to resist the high pressure actuator with continually decreasing resistance after a predetermined pressure has been reached, and means to stop movement of the high pressure actuator prior to the end of pedal travel and prior to the end of travel of the low pressure actuator.

ADIEL Y. DODGE.